Patented July 3, 1951

2,558,728

UNITED STATES PATENT OFFICE 2,558,728

THERMOSTABLE POLYMERIC VINYLIDENE CHLORIDE COMPOSITION

Edgar C. Britton and Walter J. Le Fevre, Midland, Mich., assignors to The Dow Chemical Company, Midland, Mich., a corporation of Delaware No Drawing. Application April 25, 1949, Serial No. 89,579

4 Claims. (Cl. 260—45.85)

This invention relates to compositions of matter containing polymeric vinylidene chloride products and stabilizing agents to protect the polymeric products from thermal decomposition.

The polymer of vinylidene chloride and many of its copolymers have been described in patents and in other literature during recent years. Such polymeric bodies, and compositions containing them, are herein referred to as polymeric vinylidene chloride products. It has been found that most such products tend to darken after prolonged exposure to elevated temperatures. This darkening is accompanied by a change in the other physical properties of the polymeric product and is assumed to be an evidence of partial decomposition. Because of the many desirable properties of polymeric vinylidene chloride products, a means is sought to overcome or to prevent the tendency for such products to darken on heating.

It is, accordingly, among the objects of the present invention to provide a composition of matter comprising a polymeric vinylidene chloride product stabilized against the darkening and decompositional effects of heat. A related object is to provide a heat stabilizer for polymeric vinylidene chloride products.

It has now been found that the foregoing and related objects may be attained through the incorporation in polymeric vinylidene chloride products of small amounts, generally in the range of from about 0.5 to about 5 per cent by weight of ethylene-diamine N,N'-tetra-acetic acid and its alkali metal and alkaline earth metal salts. The preferred stabilizer is a compound from the group consisting of ethylene-diamine, N,N'-tetra-acetic acid having the formula

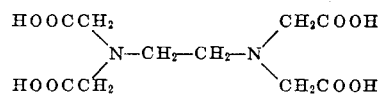

and salts thereof wherein at least two of the hydrogen ions of said acid are replaced by two identical alkali metal ions and the other two hydrogen ions are replaced by ions selected from the class consisting of an alkaline earth metal ion and independently selected alkali metal ions. There are many groups of salts that conform to the above definition. One such group may be represented by salts of the said acid, the hydrogen ions of which are replaced by four mono-valent alkali metal ions. Examples of these salts are the tetra-sodium salt, the tetra-potassium salt, the tetra-lithium salt, the dilithium disodium salt, the dilithium dipotassium salt, and the dipotassium disodium salt. Another such group is represented by salts of the said acid, two hydrogen ions of which are replaced by one divalent alkaline earth metal ion and the other two hydrogen ions by two identical mono-valent alkali metal ions. Examples of these salts are the calcium disodium salt, the barium disodium salt, the calcium dilithium salt, the barium dilithium salt, the calcium dipotassium salt, and the barium dipotassium salt. The compounds of the above class have been found useful in polymeric vinylidene chloride products whether or not such modifiers as plasticizers, light stabilizers, or coloring agents are also present.

By way of example, a copolymer of vinylidene chloride and vinyl chloride was intimately mixed with 2 per cent by weight of one of the defined salts of ethylene-diamine N,N'-tetra-acetic acid. Each such composition was heated at 150° C. for various lengths of time after being molded into samples of uniform thickness (about 0.02 inch). The amount of decomposition was judged from the darkening of the various samples and this in turn was evaluated by using an arbitrarily adopted numerical scale from 1 to 10 wherein 1 refers to a colorless product at the top of the scale and 10 to a very dark brown or black product at the bottom of the scale. For the sake of brevity in the table below, the letter A refers to a copolymer of about 85 per cent vinylidene chloride and about 15 per cent vinyl chloride and B refers to a copolymer of about 73 per cent vinylidene chloride and about 27 per cent vinyl chloride. All of the compositions reported in the table below, except the blanks, contained 2 per cent by weight of the particular stabilizing agent. Other tests have indicated that the amount of stabilizers may be as little as 0.5 per cent, especially when the thermal conditions to be encountered by the composition are not extreme. In no case has it been found advantageous or desirable to employ more than 5 per cent of these compounds for their stabilizing effect.

| Heat Stabilizing Agent | Ratings of Samples heated at 150° C. for— | | | | | |
|---|---|---|---|---|---|---|
| | A | | | B | | |
| | 1 Min. | 15 Min. | 30 Min. | 1 Min. | 15 Min. | 30 Min. |
| Blank | 5 | 8 | 10 | 1 | 5 | 9 |
| Ethylene - diamine N,N'-tetra-acetic acid | 3 | 7 | 9 | 1 | 4 | 7 |
| Dilithium disodium salt | 2 | 4 | 5 | 1 | 2 | 3 |
| Calcium disodium salt | 2 | 4 | 6 | 2 | 5 | 6 |
| Barium disodium salt | 2 | 3 | 4 | 2 | 5 | 6 |

Plasticized compositions of the copolymers designated as "A" and "B" with the various heat stabilizing agents represented in the above table showed increased heat stability over samples of the same copolymers without heat stabilizing agents. Thus, copolymer "A" modified with 15 per cent of dibutyl sebacate and 2 per cent of the above-noted disodium calcium salt, when tested in the same way, had ratings of 1, 3 and 3 after 1, 15 and 30 minutes, respectively, at 150° C.

We claim:

1. A composition of matter comprising a copolymer of vinylidene chloride and vinyl chloride which tends to darken when heated, and, as a heat stabilizing agent therefor, from 0.5 to 5 per cent by weight of the dilithium disodium salt of ethylene-diamine N,N'-tetra-acetic acid.

2. A composition of matter comprising a copolymer of vinylidene chloride and vinyl chloride which tends to darken when heated, and, as a heat stabilizing agent therefor, from 0.5 to 5 per cent by weight of the calcium disodium salt of ethylene-diamine N,N'-tetra-acetic acid.

3. A composition of matter comprising a copolymer of vinylidene chloride and vinyl chloride which tends to darken when heated, and, as a heat stabilizing agent therefor, from 0.5 to 5 per cent by weight of the barium disodium salt of ethylene-diamine N,N'-tetra-acetic acid.

4. A composition of matter comprising a polymeric vinylidene chloride product which tends to darken when heated, and, as a heat stabilizing agent therefor, from 0.5 to 5 per cent by weight of a salt of ethylene diamine N,N'-tetra-acetic acid wherein at least two of the hydrogen ions of said acid are replaced by two identical alkali metal ions and the other two hydrogen ions are replaced by ions selected from the class consisting of an alkaline earth metal ion and alkali metal ions.

EDGAR C. BRITTON.
WALTER J. LE FEVRE.

REFERENCES CITED

The following references are of record in the file of this patent:

UNITED STATES PATENTS

| Number | Name | Date |
|---|---|---|
| 2,407,645 | Bersworth | Sept. 17, 1946 |
| 2,413,856 | Bersworth | Jan. 7, 1947 |